United States Patent

Pattison et al.

[15] 3,690,112
[45] Sept. 12, 1972

[54] METHOD AND APPARATUS FOR ATTACHING PIPELINES TO OFFSHORE STRUCTURES

[72] Inventors: Martin Oren Pattison, Los Angeles, Calif.; Willy Frank Bohlmann, Jr., Los Angeles, Calif.

[73] Assignee: Esso Production Research

[22] Filed: Feb. 10, 1971

[21] Appl. No.: 114,286

[52] U.S. Cl. ................................. 61/72.3, 166/.6
[51] Int. Cl. ................................................ F16l 1/00
[58] Field of Search ........ 61/72.3, 72.1, 46.5; 166/.5, 166/.6

[56] References Cited

UNITED STATES PATENTS

| | | | |
|---|---|---|---|
| 3,308,881 | 3/1967 | Chan et al. | 166/.6 |
| 3,524,323 | 8/1970 | Miller | 61/46.5 |
| 3,363,683 | 1/1968 | Corley, Jr. et al. | 166/.5 |
| 3,373,570 | 3/1968 | Hindman | 61/72.3 |
| 3,530,680 | 9/1970 | Gardner, Jr. | 61/72.3 |

*Primary Examiner*—Jacob Shapiro
*Attorney*—Thomas B. McCulloch, Melvin F. Fincke, John S. Schneider and Sylvester W. Brock, Jr.

[57] ABSTRACT

A pipe guidance system is attached to an offshore structure. A remote pipe guide connected to a pipeline being laid underwater is pulled to and properly positioned adjacent the offshore structure by means of the pipe guidance system. A riser pipe is guided to a position for connection to the pipeline by means of a riser guide which is also attached to the offshore structure. Then the pipeline and riser pipe are connected together. The pipe guidance system includes at least one pulley connected to the offshore structure and a cable arranged about the pulley. One end of the cable is connected to power means for applying a pulling force on the cable and the other end is connected to the pipe guide.

9 Claims, 8 Drawing Figures

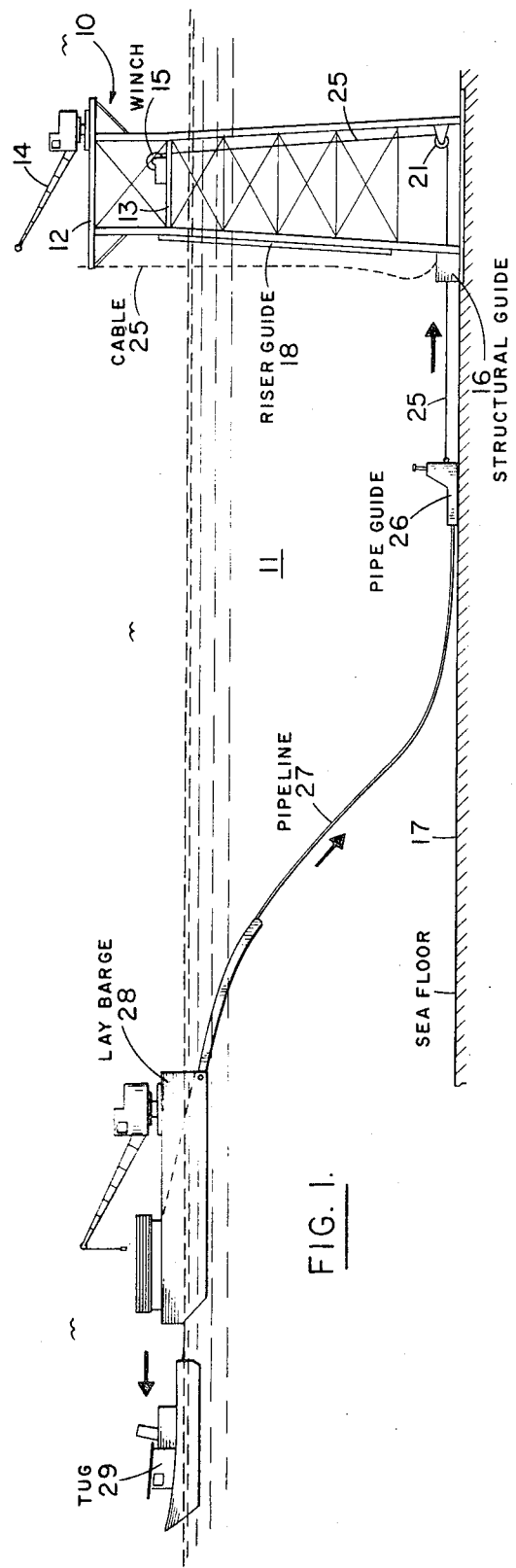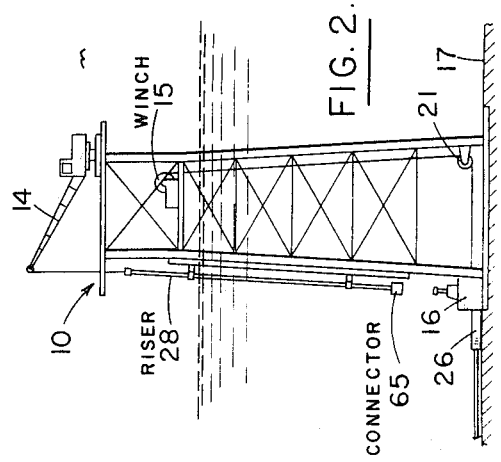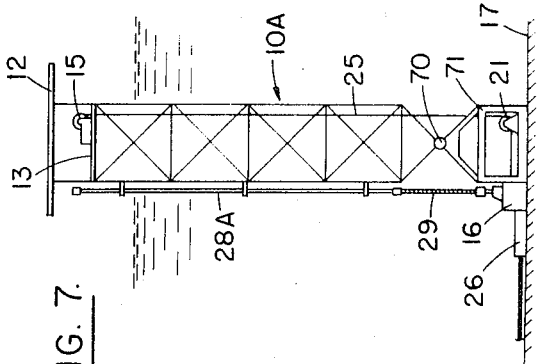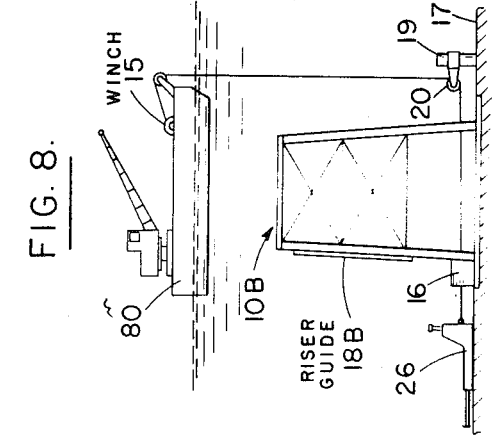

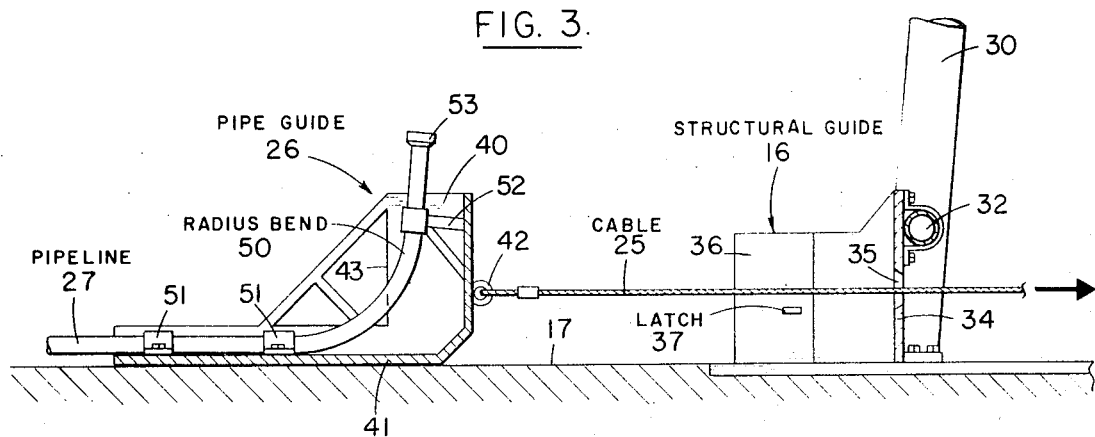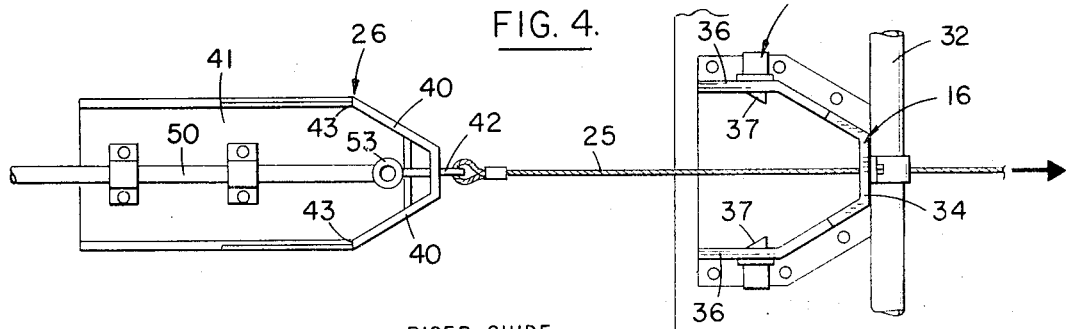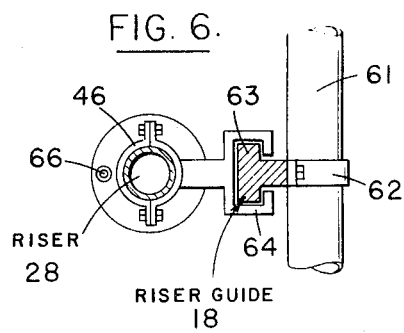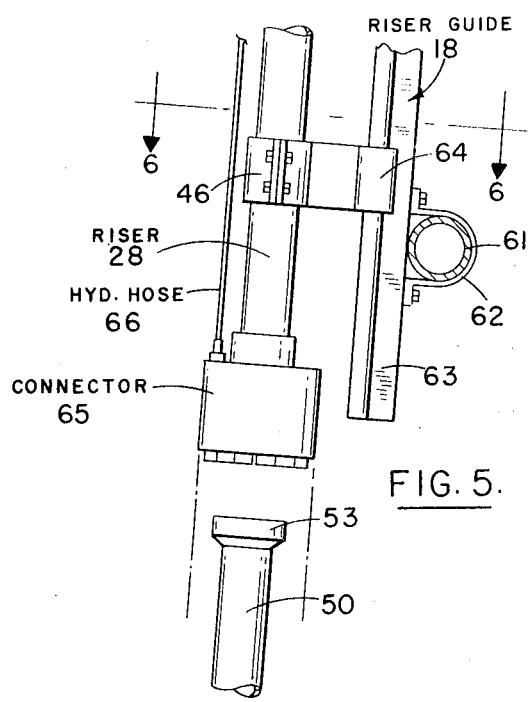

METHOD AND APPARATUS FOR ATTACHING PIPELINE TO OFFSHORE STRUCTURES

BACKGROUND OF THE INVENTION

The present invention concerns laying and attaching pipelines to offshore structures. More specifically, the invention concerns laying a pipeline offshore, guiding the pipeline to an offshore structure and then connecting the pipeline to a riser pipe which is arranged on the offshore structure.

SUMMARY OF THE INVENTION

The present invention involves a method for laying offshore pipelines and connecting these pipelines to offshore structures and briefly comprises the steps of: laying a pipeline having a curved section of pipe on the free end thereof on water bottom under tension from a lay barge; pulling the submerged free end of said pipeline to an offshore structure; lowering a riser pipe from the water's surface to said free end of said pipeline; and then connecting said riser pipe to said free end of said pipeline.

The present invention also involves offshore structure apparatus comprising an offshore platform having a riser pipe guide arranged thereon; a structural guide connected to said offshore platform adjacent the lower end of said riser pipe guide; a riser pipe extending through said riser pipe guide; a submerged pipeline; a pipe guide having a curved section of pipe arranged thereon, one end of said curved section of pipe being connected at one end to said pipeline and at the other end to said riser pipe; pulley means connected to said offshore platform; a cable connected at one end to said pipe guide and passing through said pulley; power means connected to the other end of said cable for exerting a pulling force on said cable to pull said pipe guide and pipeline connected thereto to said offshore platform.

BRIEF DESCRIPTION OF THE DRAWINGS

FIGS. 1 and 2 illustrate the method of the invention and one embodiment of apparatus in accordance with the invention;

FIG. 3 is a side view of a portion of the apparatus illustrated in FIGS. 1 and 2 in greater detail;

FIG. 4 is a top view of the apparatus illustrated in FIG. 3;

FIG. 5 is a side view of the riser pipe apparatus illustrated in FIGS. 1 and 2 in greater detail;

FIG. 6 is a view taken along lines 6—6 of FIG. 5;

FIG. 7 illustrates another embodiment of the invention; and

FIG. 8 illustrates still another embodiment of the invention.

DESCRIPTION OF THE PREFERRED EMBODIMENTS OF THE INVENTION

There is shown in FIGS. 1 and 2 an offshore platform structure 10 located in a body of water 11. Platform 10 is provided with an upper deck 12 and a lower deck 13. A crane 14 is positioned on deck 12 and a winch 15 is positioned on deck 13. A structural guide 16 is connected to offshore structure 10 on sea floor or water bottom 17. A riser pipe guide 18 is also attached to offshore structure 10. A pulley 21 is connected to the offshore structure 10 adjacent the lower portion thereof. A cable 25, connected at one end to winch 15, extends about pulley 21 and through structural guide 16 to a pipe guide 26 as shown in FIG. 1. A pipeline 27 is shown being laid on water bottom from a lay barge 28 being towed by a tug 29.

Details of the structural guide 16 and pipe guide 26 are shown in FIGS. 3 and 4. Structural guide 16 is a box like frame of welded construction which is attached to platform leg 30 and horizontal cross member 32 or to horizontal cross member 32 only. End plate member 34 is provided with an opening 35 through which cable 25 extends. Spring biased latch members 37 are mounted in each side 36 of structural guide 16. Sides 36 are also tapered to accommodate the forward sides 40 of a carriage or sled 41 of pipe guide 26. Cable 25 is connected to the forward end member of sled 41 as at 42. The trailing edges of sides 40 form shoulders 43 which are engaged by latches 37 when guide 26 is positioned in structural guide 16. A curved section of pipe 50 is connected to the free end of pipeline 27 and secured to sled 41 by clamps 51 and support 52. The curved section of pipe 50 terminates in a connector portion 53.

Riser pipe guide 18 (FIG. 5) is secured to cross bracing 61 of offshore structure 10 by clamps or welded bracket 62. The riser pipe guide includes a T-shaped member 63 (see FIG. 6) on which guide elements 64, secured to riser pipe 28 by clamps 46, slide. The lower end of riser pipe 28 is provided with a hydraulically operated connector 65. A hydraulic hose 66 extends from connector 65 to decks 12 or 13. The hydraulic connector 65 is commercially available and may be suitably one such as disclosed in the *Composite Catalog of Oil Field Equipment and Services*, page 1248, Vol. 1, 1966-67, Published by *World Oil*.

In the operation of this apparatus the free end of cable 25 shown in dashed lines in FIG. 1 is connected to pipe guide 26 initially located on lay barge 28 and the first section of pipeline 27 is connected to the curved section of pipe 50 secured to sled 41. Pipe lay barge 28 begins laying pipeline 27 under tension while winch 15 on deck 13 takes in on the pipe guide 26 until pipe guide 26 is pulled into the structure guide 16 as additional sections of pipeline 27 are laid. Latches 37 securely lock pipe guide 26 to structure guide 16. Horizontal movement of pipe guide 26 when contained in structure guide 16 is restricted but vertical movement although restrained is not fixed. After securing the pipe guide in the structure guide, pipe lay barge 28 continues laying the pipeline on the water bottom.

Pipeline riser 28, together with connector 65 and hydraulic hose 66 and guide members 64, is guided by riser pipe guide 63 along a predetermined path to the water bottom. The riser pipe is made up as it is lowered by welding additional joints or by other means of attachment. When it is in position adjacent the end 53 of curved pipe 50 connector 65 is operated to connect riser pipe 28 and curved pipe 50 together.

A buoyant tower platform structure 10A is illustrated in FIG. 7. A ball (or swivel joint) 70 connects platform 10A to a base member 71 secured to the sea floor 17. Platform 10A contains buoyancy means and decks 12 and 13. A winch 15 is positioned on deck 13. Base member 71 is provided with a pulley 21. As in the embodiment of FIGS. 1 and 2 a cable 25 is connected at one end to winch 15 and extends about pulley 21 and through structural guide 16 to pipe guide 26. A modified riser pipe 28A contains a flexible pipe section 29 on its lower end to permit the riser pipe to flex when the platform oscillates on the joint. The pipeline is laid and connected to the riser pipe in the same manner as described heretofore with respect to FIGS. 1 and 2.

In FIG. 8 a submerged platform 10B provided with a riser pipe guide 18B is shown. In this modification a cable pulley 20 is attached to a support post or piling 19 which is driven into the seal floor 17 adjacent platform 10B. Winch 15, which, as in the other embodiments is used to apply pulling force to cable 25, is located on a floating vessel 80. The pipe guide system of FIG. 8 operates the same way the guide systems of FIGS. 1–2 and FIG. 7 operate.

Advantages of the method and apparatus of this invention include the following:

It is not necessary to moor the pipe lay barge close to the offshore structure. The apparatus provides its own alignment. Pipe laying operations can be continuous once the pipe guide is attached to the offshore structure. The invention is applicable to various types of offshore structures including a rigid type platform, a submerged rigid type platform and a buoyant tower oscillation type platform. It is not necessary for a pipe lay barge to install the riser. Pipe laying operations can be initiated at a considerable distance from the structure.

Having fully described the operation, advantages, method and apparatus of my invention, I claim:

1. A method for laying pipelines and connecting said pipelines to an offshore structure arranged in a body of water and extending from the bottom of said water to above the surface of said water comprising;
   securing a curved section of pipe to a pipe guide capable of being pulled along the bottom of said water, said curved section of pipe having one end extending generally horizontally and the other end extending generally vertically when said pipe guide is positioned on the bottom of said water;
   connecting one end of a pipeline being laid to said offshore structure to said one end of said curved section of pipe;
   pulling said pipe guide and curved section of pipe and said pipeline attached to said curved section of pipe along the bottom of said water and guiding said pipe guide into a structure guide attached to said offshore structure adjacent the bottom of said water and then locking said pipe guide in said structure guide;
   lowering a riser pipe from the surface of said water to adjacent the bottom of said water guided by a riser guide attached to said offshore structure and extending substantially vertically from adjacent the surface of said water to adjacent the bottom of said water; and
   then connecting said riser pipe to the other end of said curved section of pipe.

2. A method as recited in claim 1 in which said pipeline is connected to said curved section of pipe at the surface of said water and said pipe guide and pipeline is pulled along the bottom of said water into said structure guide by means of a cable attached at one end to said pipe guide and at the other end to pulling means positioned on said offshore structure, said one end of said cable being attached to said pipe guide at the surface of said water.

3. A method as recited in claim 2 in which said riser pipe is connected to the other end of said curved pipe by remotely operated hydraulic means.

4. Apparatus for laying a pipeline and connecting said pipeline to an offshore structure arranged in a body of water and extending upwardly from the bottom of said water comprising:
   a riser pipe guide attached to said offshore structure and extending substantially vertically;
   a structural guide connected to said offshore structure adjacent the lower end of said riser pipe guide;
   a pipe guide capable of being pulled along the bottom of said water into said structural guide;
   a curved section of pipe secured to said pipe guide, said curved section of pipe having one end extending substantially horizontally and the other end extending substantially vertically when said pipe guide is arranged on the bottom of said water;
   a submerged pipeline connected to said one end of said curved section of pipe;
   a riser pipe arranged on said riser pipe guide having one end extending to adjacent the upper end of said offshore structure and the other end thereof connected to the other end of said curved section of pipe;
   pulling means including power means located on said offshore structure and a cable connected to said pipe guide, said power means being capable of pulling said pipe guide and curved section of pipe and said pipeline connected thereto into said structural guide;
   said structural guide comprising a box-like frame having side plate members and an end plate member, said end plate member having an opening through which said cable extends; and
   spring biased latches arranged on said side plate members adapted to engage said pipe guide.

5. Apparatus as recited in claim 3 in which said pipe guide comprises a sled having side members and an end member, said cable being connected to said end member; and said side members having openings therein adapted to engage said structural guide.

6. Apparatus for laying a pipeline and connecting said pipeline to an offshore structure arranged in a body of water and extending upwardly from the bottom of said water comprising:
   a riser pipe guide attached to said offshore structure and extending substantially vertically;
   a structural guide connected to said offshore structure adjacent the lower end of said riser pipe guide;
   a pipe guide capable of being pulled along the bottom of said water into said structural guide;
   a curved section of pipe secured to said pipe guide, said curved section of pipe having one end extending substantially horizontally and the other end extending substantially vertically when said pipe guide is arranged on the bottom of said water;
   a submerged pipeline connected to said one end of said curved section of pipe;
   a riser pipe arranged on said riser pipe guide having one end extending to adjacent the upper end of said offshore structure and the other end thereof connected to the other end of said curved section of pipe;

pulling means including power means located on said offshore structure and a cable connected to said pipe guide, said power means being capable of pulling said pipe guide and curved section of pipe and said pipeline connected thereto into said structural guide;

said pipe guide comprising a sled having side members and an end member, said cable being connected to said end member; and said side members having openings therein adapted to engage said structural guide.

7. Apparatus for laying a pipeline and connecting said pipeline to an offshore structure arranged in a body of water and extending from the bottom of said water to above the surface of said water comprising:
- a riser pipe guide attached to said offshore structure and extending substantially vertically from adjacent the surface of said water to adjacent the bottom of said water;
- a structural guide connected to said offshore structure adjacent the lower end of said riser pipe guide;
- a pipe guide capable of being pulled along the bottom of said water into said structural guide;
- a curved section of pipe secured to said pipe guide, said curved section of pipe having one end extending substantially horizontally and the other end extending substantially vertically when said pipe guide is arranged on the bottom of said water;
- a submerged pipeline connected to said one end of said curved section of pipe;
- a riser pipe arranged on said riser pipe guide having one end extending above the surface of said water and the other end thereof connected to the other end of said curved section of pipe; and
- pulling means including power means located on said offshore structure and a cable connected to said pipe guide, said power means being capable of pulling said pipe guide and curved section of pipe and said pipeline connected thereto to said structural guide.

8. Apparatus as recited in claim 6 in which at least the lower end of said riser pipe is flexible.

9. Apparatus as recited in claim 6 in which said offshore structure is a pivotally based buoyant tower capable of oscillation.

* * * * *